(No Model.)

W. B. MASON.
FLUID PRESSURE REGULATOR.

No. 361,771. Patented Apr. 26, 1887.

Witnesses.
H. J. Livermore
H. P. Bates

Inventor.
William B. Mason,
by Jos. P. Livermore
Att'y.

UNITED STATES PATENT OFFICE.

WILLIAM B. MASON, OF BOSTON, MASSACHUSETTS, ASSIGNOR TO THE MASON REGULATOR COMPANY, OF SAME PLACE.

FLUID-PRESSURE REGULATOR.

SPECIFICATION forming part of Letters Patent No. 361,771, dated April 26, 1887.

Application filed August 23, 1886. Serial No. 211,614. (No model.)

*To all whom it may concern:*

Be it known that I, WILLIAM B. MASON, of Boston, county of Suffolk, State of Massachusetts, have invented an Improvement in Fluid-Pressure Regulators, of which the following description, in connection with the accompanying drawings, is a specification, like letters on the drawings representing like parts.

My invention relating to a fluid-pressure regulator is shown embodied in a regulator of that class commonly called a "reducing-valve," by which the pressure of a fluid that passes through and beyond the valve is never permitted to rise above a predetermined maximum amount, which is less than the usual or normal pressure on the inlet side of the valve.

The invention consists, mainly, in details of construction and novel combinations and arrangements of the parts, by which the instrument is rendered more positive and certain in operation than others heretofore generally used, and by which objectionable features usually occurring in the operation of valves of this kind are avoided.

In most valves of this class when in operation the valve is continually rising and falling on its seat, causing considerable wear and a disagreeable hammering sound; but in the instrument forming the subject of the present invention the valve when in operation comes into equilibrium in the position at which the amount of fluid flowing through will maintain the pressure at the desired point on the outlet side of the valve. In one class of reducing-valves now in use the valve is opened and closed by the differential action of two pressures acting in opposite directions upon substantially the same area, the valve being moved in one direction by the surplus of the pressure at one side over that at the other side, and in the opposite direction by an external actuating force which operates when the pressures on the two surfaces are substantially equal, or the same amount per unit of area. In the present invention, on the other hand, the valve is actuated or caused to move in each direction by fluid-pressure, and the actuating-pressure is substantially the same per unit of area, and the valve is moved in one or the other direction in accordance with the difference in area exposed.

Figure 1:
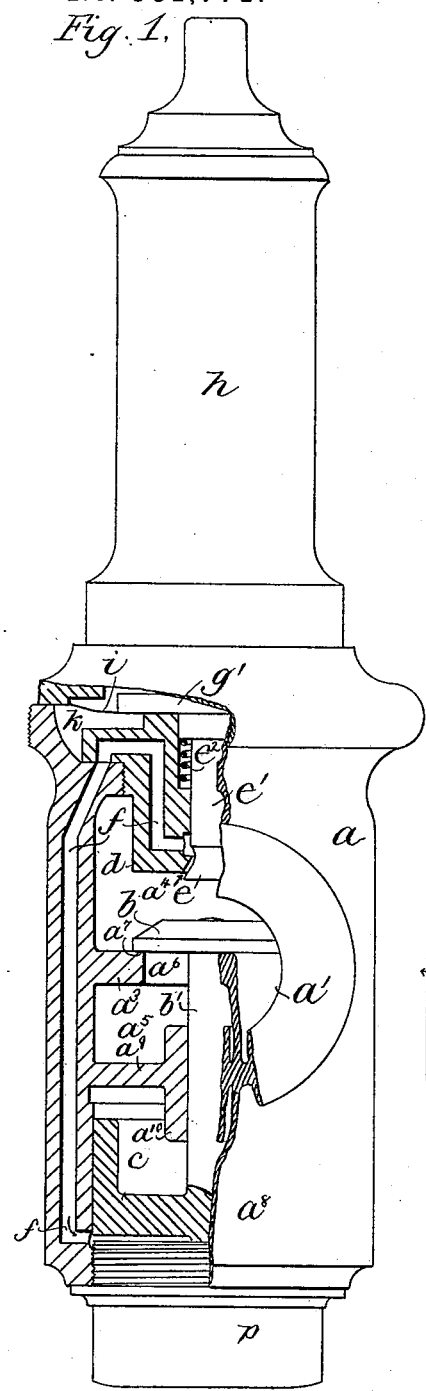
Figure 2:
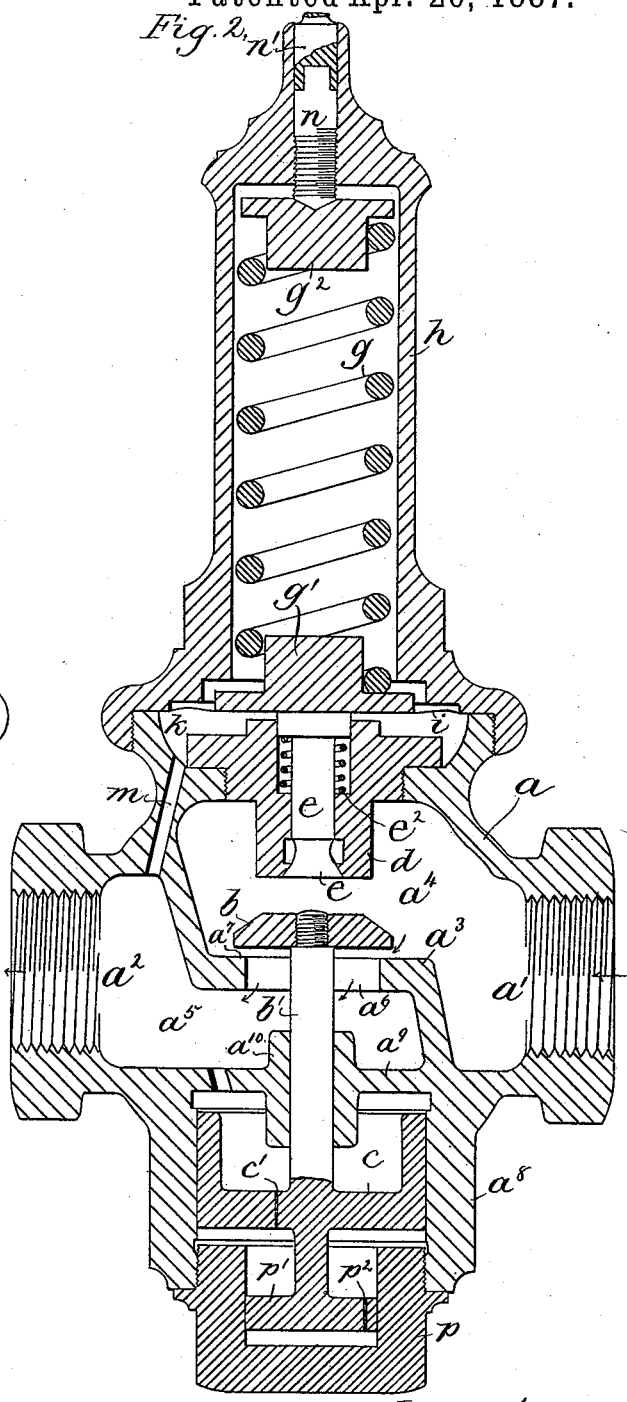

Figure 1 is an elevation, partly in section, of a fluid-pressure regulator or reducing-valve embodying this invention, the parts being shown in the position assumed when no fluid is acting thereon; Fig. 2, a longitudinal section thereof on a plane at right angles to the plane of projection of Fig. 1.

The main body or valve-shell $a$ of the instrument has the usual inlet and outlet openings, $a'$ $a^2$, separated by a partition, $a^3$, which divides the shell into inlet and outlet chambers $a^4$ and $a^5$, and is provided with the passage or opening $a^6$, that connects the said chambers, and around which is formed the valve-seat $a^7$ for the valve proper, $b$, which works in the inlet-chamber $a^4$, and when seated is exposed to the full pressure of the fluid entering the valve-shell. The said valve $b$ when unseated is practically acted upon at its upper side by the [pressure of the fluid in the inlet-chamber of the valve, and at its under side by the usually smaller pressure of the fluid at the outlet side of the valve, so that there is a tendency to seat the valve derived from the fluid-pressure acting upon it.

The valve-shell $a$ is provided with an extension, $a^8$, below the outlet portion $a^5$, and in free communication therewith, although preferably partly separated from said chamber by a web or bridge, $a^9$, provided with a guide, $a^{10}$, for the stem $b'$ of the valve $b$. The said extension $a^8$ forms a cylinder for the valve-actuating piston $c$, which is connected and preferably made integral with the valve-stem $b'$, and is of greater area than the valve $b$ or passage with which it co-operates, the proportion of these areas being preferably about two to one. The upper surface of the valve-actuating piston $c$ is therefore exposed to the pressure of fluid in the outlet-chamber of the valve, which pressure acts in the opposite direction to that on the under side of the valve $b$, and is of substantially the same amount per unit of area, and consequently has about double the force tending to move the valve, so that the tendency of the pressure in the outlet portion of the valve acting on the upper surface of the piston $c$ and under surface of the valve $b$, like that in the inlet-chamber acting on the upper surface only of the valve $b$, is to close the said valve.

The inlet-chamber $a^4$ of the main valve-shell is provided with a cap, $d$, containing a secondary or governing valve, $e$, controlling a port or passage, $f$, (see Fig. 1,) that connects the said inlet-chamber $a^4$ with the cylinder $a^8$, below the valve-actuating piston $c$. The stem $e'$ of the valve $e$ is acted upon by a predetermined governing force, which may be derived from a weight or spring, and, as shown in this instance, is produced by a spring, $g$, contained in a spring-chamber, $h$, connected with the valve-shell $a$, the said spring $g$ acting on a head or bearing-piece, $g'$, resting on a diaphragm, $i$, directly over the upper end of the valve-stem $e'$, so that when unbalanced the said spring $g$ forces the said valve-stem and valve downward until the diaphragm and head $g'$ come to a bearing on the upper end of the cap $d$, as shown in Fig. 1, thus opening the valve $e$ and permitting the fluid to pass from the inlet portion $a^4$ of the valve-shell through the port $f$, into the cylinder $a^8$, where it acts on the under surface of the piston $c$. The valve $e$ is kept up against the under side of the diaphragm $i$ by a light spring, $e^2$. A pressure-chamber, $k$, is formed in the upper portion of the valve-shell $a$, between the cap $d$ and the diaphragm $i$, the under surface of which latter is thus exposed to whatever pressure may be in the chamber $k$, which pressure acts in opposition to the spring $g$, tending to raise the same, and permit the valve $e$ to close. When, as in this instance, the regulator is to be used as a reducing-valve, the pressure-chamber $k$ is connected by a port, $m$, with the outlet portion $a^5$ of the valve-shell, or with any other place containing the fluid, the pressure of which is to be regulated, and the spring $g$ is so adjusted that when the pressure of the fluid to be regulated rises to the desired predetermined maximum amount the said pressure in the chamber $k$, acting on the under side of the diaphragm $i$, will be just sufficient to overcome the force of the spring $g$ and move the head $g'$ far enough to permit the valve $e$ to close.

The pressure of the spring $g$ may be regulated and adjusted by a follower, $g^2$, acted upon by an adjusting device, $n$, shown as a screw bearing on the said follower, and adapted to be turned by a screw-driver, wrench, or key, $n'$.

The lower end of the cylinder $a^3$ in the valve-shell is closed by a cap or bonnet, $p$, having a cylindrical bore that co-operates with a piston, $p'$, connected with the valve-actuating piston $c$. The said piston $p'$ has a loose fit in the bore of the cap $p$, or has a small passage, $p^2$, and when the instrument is operated with steam, as is usually the case, the cap $p$ will become filled with water of condensation, and will act as a dash-pot to prevent sudden movement of the valve-actuating piston and valve.

Normally, before the fluid begins to flow through the valve, the valve proper, $b$, will be closed, and if, as is generally the case, the pressure on the outlet side of the valve is below the predetermined maximum, the controlling-valve $e$ will be held open by the action of the spring $g$, as shown in Fig. 1. Then when the fluid is admitted to the instrument, it will act on the upper surface of the main valve $b$, tending to keep the same seated, but will also be admitted through the port $f$ to the cylinder $a^8$, below the piston $c$, and, as the latter is of greater area than the valve $b$, and the pressure per unit of area is the same on both, the valve will be opened by the surplus total pressure acting upward on the piston $c$ over that acting downward on the valve $b$.

The valve $b$ will then remain open and the fluid will flow through until its pressure in the outlet-chamber and connected pressure-chamber $k$ rises to the predetermined maximum, when it overcomes the spring $g$ and permits the governing-valve $e$ to close, as shown in Fig. 2, thus cutting off the admission of fluid at high pressure to act on the under surface of the piston $c$. The said piston $c$ has a loose fit in its cylinder, or is provided with a small leak or passage, $c'$, of much less capacity than the port $f$, so that it does not materially reduce the pressure at the under side of the piston when the valve $e$ and passage $f$ is fully open; but when said passage is closed the pressure quickly falls in the cylinder below the piston $c$ until equal to that above the said piston, and the valve $b$ then tends to close both by its weight and also by the unbalanced pressure of the fluid in the inlet-chamber of the valve.

When fluid at the predetermined pressure is being continuously drawn from the outlet portion of the valve-shell while the inlet portion has a greater supply at a higher pressure, the parts will come into equilibrium with the spring $g$ partly compressed by the pressure of the fluid in the chamber $k$, and the valve $e$ in such position as to admit fluid to act on the under surface of the piston $c$ just enough to balance the pressure of the fluid on the main valve $b$, which will thus hang in equilibrium a sufficient distance above its seat to permit the fluid at higher pressure to flow through and expand to the lower pressure just as fast as the fluid at lower pressure is withdrawn, and any variation in the withdrawal of fluid will be accompanied by an immediate change in the pressure-chamber $k$, accompanied by a corresponding change in the position of the valve $e$, which will produce a corresponding change in the admission of fluid to the under surface of the piston $c$, and thus produce a change in the position of the valve $b$, raising the same from its seat if the withdrawal of fluid increases and the pressure on the outlet side of the valve consequently tends to diminish, and causing the valve to approach its seat if the withdrawal diminishes, with a corresponding tendency to increase the pressure in the chamber $k$.

The dash-pot and regulating or cushioning piston connected with the valve will prevent sudden movement, so that the valve $b$ will not flutter or chatter on its seat, but will be quiet and steady in its operation instead of having a vibrating movement, as is usual in apparatus of this kind as heretofore made. If the apparatus is used with a non-condensing fluid or gas, the dash-pot $p$ may be filled with a liquid, or the regulating-piston $p'$ have a tighter fit, so as to cushion on the gas.

I claim—

1. The main valve-shell having inlet and outlet portions, and a cylinder and passage connecting it with the inlet portion, combined with the main valve controlling the passage of fluid from the inlet to the outlet portion, the said valve working in the inlet portion and being acted upon by the pressure in said portion in the direction to close or seat the valve, and the valve-actuating piston connected therewith working in the cylinder of the valve-shell, the said piston being acted upon by the pressure in the outlet portion of the valve-shell in the direction to seat the valve, and a governing-valve controlling the flow of fluid from the inlet-chamber to the cylinder in which it acts on the piston in the direction to unseat the valve, substantially as described.

2. The main valve-shell having inlet and outlet portions, and the cylinder communicating at one end with the outlet portion, and a passage connecting the other end of said cylinder with the inlet portion of the valve-shell, combined with the main valve working in the inlet portion of the valve-shell, and a connected valve-actuating piston of greater area working in the cylinder of the valve-shell, and a governing-valve controlling the passage that connects the inlet portion of the valve-shell with the cylinder, substantially as described.

3. The main valve-shell having inlet and outlet portions, and a cylinder communicating at one end with the outlet portion, and a cap for the inlet portion and passage connecting the inlet portion with the other end of the said cylinder, and a pressure-chamber above the said cap, combined with the main valve, and connected valve-actuating piston working in said cylinder, and a secondary governing-valve working in the cap and controlling the connecting passage between the cylinder and inlet portion of the valve-shell, the said governing-valve being operated in accordance with changes of pressure in the pressure-chamber, substantially as described.

4. The main valve-shell having inlet and outlet portions, and a cylinder, combined with the main valve and connected valve-actuating piston working in said cylinder, and connected regulating or cushioning piston and dash-pot co-operating therewith, and a secondary or governing valve controlling the fluid acting on the valve-actuating piston, substantially as described.

5. The main valve-shell $a$, having inlet and outlet portions, and an extension, $a^8$, and bridge or diaphragm $a^9$ between the said extension, and the main portion of the valve-shell, provided with a guide, $a^{10}$, combined with the main valve and its actuating-piston working in the said cylinder, and connected stem working in the said guide-passage, and a secondary or governing valve controlling the action of the fluid on the said piston, substantially as described.

6. The main valve-shell having inlet and outlet portions, and a cylinder, combined with the main valve, and connected valve-actuating piston working in the said cylinder, and connected regulating or cushioning piston and dash-pot co-operating therewith, said dash-pot being located below the main valve-shell in position to receive and contain liquid condensed from the fluid passing through the valve-shell, substantially as described.

7. The main valve-shell $a$, having inlet and outlet portions, and a cylindrical extension, $a^8$, below said outlet portion, combined with the cap $p$ at the end of said extension, and the main valve, its actuating-piston working in said extension, and connected regulating-piston working in said cap, substantially as described.

In testimony whereof I have signed my name to this specification in the presence of two subscribing witnesses.

WM. B. MASON.

Witnesses:
   Jos. P. LIVERMORE,
   WALTER G. CHASE.